(12) United States Patent
Hulubei et al.

(10) Patent No.: US 8,610,717 B2
(45) Date of Patent: Dec. 17, 2013

(54) EFFICIENT PRE-COMPUTING OF SIMPLIFIED VECTOR DATA FOR RENDERING AT MULTIPLE ZOOM LEVELS

(71) Applicant: Google Inc., Mountain View, CA (US)

(72) Inventors: Tudor Hulubei, New York, NY (US); David Eustis, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/912,264

(22) Filed: Jun. 7, 2013

(65) Prior Publication Data

US 2013/0271479 A1 Oct. 17, 2013

Related U.S. Application Data

(63) Continuation of application No. 13/027,540, filed on Feb. 15, 2011, now abandoned.

(51) Int. Cl.
*G06T 17/00* (2006.01)

(52) U.S. Cl.
USPC .......................................... 345/428; 345/441

(58) Field of Classification Search
USPC ........................... 345/428, 441, 442, 443, 532
See application file for complete search history.

(56) References Cited

U.S. PATENT DOCUMENTS

| | | | |
|---|---|---|---|
| 6,812,925 | B1 | 11/2004 | Krishnan et al. |
| 7,859,536 | B2 | 12/2010 | Poppen |
| 7,881,562 | B2 | 2/2011 | Bowman et al. |
| 2007/0229510 | A1 | 10/2007 | Rey |
| 2008/0201302 | A1 | 8/2008 | Kimchi et al. |
| 2008/0231643 | A1 | 9/2008 | Fletcher et al. |
| 2008/0253757 | A1 | 10/2008 | Bells et al. |

OTHER PUBLICATIONS

"S2-Geometry-Library" [online]. [Retrieved Feb. 9, 2011]. Retrieved from the internet: <https://code.google.com/p/s2-geometry-library/source/browse/geometry/s2polygon.cc>, copyright 2005, 19 pages.
"S2-Geometry-Library" [online]. [Retrieved Feb. 9, 2011]. Retrieved from the internet: <https://code.google.com/p/s2-geometry-library/source/browse/geometry/s2polyline.h>, copyright 2005, 4 pages.
"S2-Geometry-Library" [online]. [Retrieved Feb. 9, 2011]. Retrieved from the internet: <https://code.google.com/p/s2-geometry-library/source/browse/geometry/s2polygonbuilder.h>, copyright 2006, 6 pages.
International Search Report dated Oct. 16, 2012, in International Application No. PCT/US2012/024419.

*Primary Examiner* — Xiao M. Wu
*Assistant Examiner* — Scott E Sonners
(74) *Attorney, Agent, or Firm* — Lerner, David, Littenberg, Krumholz & Mentlik, LLP (57) ABSTRACT

Aspects of the invention relate generally to accessing, storing, and processing vector data to represent various geographical features such as roads, rivers, lakes, countries, continents, and oceans on one or more maps. More specifically, the vector data may be pre-simplified for rendering at different zoom levels. The simplification process is based on removing vertices from vector data in order to reduce the number of points in a given polygon or line. As this process is very expensive in terms of time and processing power, the system and method allow for estimation of the proportion of vertices which that would be removed from the original geometry. Based on this estimation, one may decide whether or not the simplification is worth the effort to compute and store the simplified data.

16 Claims, 7 Drawing Sheets

EFFICIENT PRE-COMPUTING OF SIMPLIFIED VECTOR DATA FOR RENDERING AT MULTIPLE ZOOM LEVELS

CROSS-REFERENCE TO RELATED APPLICATIONS

The present application is a continuation of U.S. patent application Ser. No. 13/027,540, filed Feb. 15, 2011, the disclosure of which is incorporated herein by reference.

BACKGROUND OF THE INVENTION

Various map services employ vector data to represent geographical features such as roads, rivers, lakes, countries, continents, oceans, etc. For example, a geographical feature or object may be represented by connecting the vertices of one or more vectors. While the great majority of these features are relatively small, for example, about 1-1.5 kilobyte, a significant number of them may be extremely large, for example, on the order of a megabyte or larger. The largest features may involve hundreds of thousands, or sometimes millions of vertices. Transmitting all of this information to a client device to render these features at all zoom levels based on their original geometry is impractical and wasteful of computing resources.

These map services may receive a request from a client device for a map of a given location and, in response, transmit a portion of the map information for display on the client device. These services may also transmit highly accurate map information as vector data and allow the client device to render the map at various zoom levels based on the same information. In other words, the client device may not request a new map each time the user "zooms" in or out of the map. Rather, each "zoom" level is redrawn based on the vector data received from the service.

Thus, the same amount of data and accuracy exists when the client device renders the map at the highest zoom level as at the lowest zoom level. However, at the lowest zoom level many objects may no longer be visible as they may overlap one another or be drawn within a single pixel. For example, as a user zooms out, such that a larger geographic area is displayed, many of the details of an object may be obscured as more of the map information is packed into a smaller area and less and less of the object's vertices are distinguishable.

For example, a user may examine the coast of Massachusetts in order to explore the vector data representation of the Atlantic Ocean. The map information associated with the Atlantic Ocean may include well over a million vertices. However, when zooming out at world level, all of the finer details in the geometry of the Atlantic Ocean (or the Massachusetts coastline) are no longer distinguishable. Many of the vertices that make up the Atlantic Ocean may actually overlap on the same screen pixel. Thus, rendering the Atlantic Ocean at such a high zoom level does not require the same level of accuracy as when exploring the coastline of a particular Massachusetts town.

BRIEF SUMMARY OF THE INVENTION

Aspects of the invention relate generally to accessing, storing and providing vector data to represent various geographical features such as roads, rivers, lakes, countries, continents, and oceans on one or more maps. More specifically, the vector data may be pre-simplified for rendering at different zoom levels. For example, for a range of zoom levels, at the highest zoom level, a relatively small geographic area may be displayed with a high level of detail. At the lowest zoom level, a relatively large geographic area may be displayed in lower detail.

The simplification process is based on removing vertices from vector data in order to reduce the number of points in a given polygon or line. Such a process may be very expensive in terms of time and processing power; thus, aspects of the invention allow for estimation of the proportion of vertices that may be removed from the original geometry. Based on this estimation, one may decide whether or not the simplification is worth the effort to compute and store the simplified data.

One aspect of the invention provides a computer-implemented method. The method includes accessing map information associated with a first zoom level. The map information includes a plurality of vertices associated with one or more objects such that each object is associated with a set of one or more vertices of the plurality of vertices. The method also includes identifying a minimum threshold proportion for determining whether to simplify the map information. A tolerance distance value associated with a second zoom level that includes a lesser amount of detail than the first zoom level is identified. A processor determines a subset of the plurality of vertices based on (1) for each object of the one or more objects, calculating a distance from each given vertex of the set of one or more vertices associated with the object to a line between the immediate neighboring vertices of the given vertex, and (2) determining whether each calculated distance is less than or equal to the tolerance distance value associated with the second zoom level. A proportion is determined based on the subset and the plurality of vertices. If the proportion is greater than or equal to the minimum threshold proportion, a simplified version of the map information is calculated at the second zoom level.

In one example, the method also includes identifying a tolerance distance value associated with a third zoom level. If the proportion is less than the minimum threshold value, the processor determines a second subset of the plurality of vertices. The second subset is determined based on (1) for each object of the one or more objects, calculating the distance from each given vertex of the set of one or more vertices associated with the object to a line between the immediate neighboring vertices of the given vertex, and (2) determining whether each calculated distance is less than or equal to the tolerance distance value associated with the third zoom level. A second proportion is determined based on the second subset and the plurality of vertices. If the second proportion is greater than the minimum threshold value, another simplified version of the map information is calculated at the third zoom level.

In one alternative, the second zoom level includes a greater level of detail than the third zoom level. In another alternative, the tolerance distance value associated with the second zoom level is less than the tolerance distance value associated with the third zoom level.

In another example, the simplified version of the map information at the second zoom level includes a second plurality of vertices of the plurality of vertices associated with one or more second objects such that each second object is associated with a second set of one or more vertices of the plurality of vertices. A tolerance distance value associated with a third zoom level which includes a lesser amount of detail than the second zoom level is identified. The method also includes determining, by a processor, a second subset of the plurality of vertices. The second subset is based on (1) for each second object of the one or more second objects, calculating a distance from each given vertex of the second set of one or more vertices associated with the second object to a line between the immediate neighboring vertices of the given vertex associated with the second object, and (2) determining whether each calculated distance is less than or equal to the tolerance distance value associated with the third zoom level. A second proportion is determined based on the second subset and the plurality of vertices. If the second proportion is greater than or equal to the minimum threshold value, a second simplified version of the map information at the third zoom level is calculated.

In one alternative, the method also includes identifying a tolerance distance value associated with a fourth zoom level. If the second proportion is less than the minimum threshold value, determining, by the processor, a third subset of the plurality of vertices. The third subset is based on (1) for each second object of the one or more second objects, calculating a distance from each given vertex of the set of one or more vertices associated with the second object to a line between the immediate neighboring vertices of the given vertex associated with the second object, and (2) determining whether each calculated distance is less than or equal to the tolerance distance value associated with the fourth zoom level. A third proportion is determined based on the third subset and the plurality of vertices. If the third proportion is greater than the minimum threshold value, another simplified version of the map information at the fourth zoom level is calculated.

In another alternative, the method also includes receiving, from a first device, a request for map information associated with a particular zoom level including a particular level of detail. Responsive map information associated with a zoom level which includes a level of detail closest to the particular level of detail and which is also greater than or equal to the particular level of detail is identified. The responsive map information is transmitted to the first device for display at the particular zoom level.

In yet another alternative, the method also includes storing the simplified version of the map information at the second zoom level and the second simplified version of the map information at the third zoom level in memory accessible by the processor.

Another aspect of the invention provides a device. The device includes memory storing map information associated with a first zoom level. The map information includes a plurality of vertices associated with one or more objects such that each object is associated with a set of one or more vertices of the plurality of vertices. The device also includes a processor coupled to the memory. The processor is operable to identify a minimum threshold proportion for determining whether to simplify the map information; identify a tolerance distance value associated with a second zoom level that includes a lesser amount of detail than the first zoom level; and determine a subset of the plurality of vertices. The subset is determined based on (1) for each object of the one or more objects, calculating a distance from each given vertex of the set of one or more vertices associated with the object to a line between the immediate neighboring vertices of the given vertex, and (2) determining whether each calculated distance is less than or equal to the tolerance distance value associated with the second zoom level. The processor is also operable to determine a proportion based on the subset and the plurality of vertices. If the proportion is greater than or equal to the minimum threshold proportion, the processor is operable to calculate a simplified version of the map information at the second zoom level.

In one example, the processor is also operable to identify a tolerance distance value associated with a third zoom level. If the proportion is less than the minimum threshold value, the processor is operable to determine a second subset of the plurality of vertices. The second subset is based on (1) for each object of the one or more objects, calculating the distance from each given vertex of the set of one or more vertices associated with the object to a line between the immediate neighboring vertices of the given vertex, and (2) determining whether each calculated distance is less than or equal to the tolerance distance value associated with the third zoom level. The processor is also operable to determine a second proportion based on the second subset and the plurality of vertices. If the second proportion is greater than the minimum threshold value, the processor is operable to calculate another simplified version of the map information at the third zoom level.

In one alternative, the second zoom level includes a greater level of detail than the third zoom level. In another alternative, the tolerance distance value associated with the second zoom level is less than the tolerance distance value associated with the third zoom level.

In another example, the simplified version of the map information at the second zoom level includes a second plurality of vertices of the plurality of vertices associated with one or more second objects such that each second object is defined by a second set of one or more vertices of the plurality of vertices. In this example, the processor is further operable to identify a tolerance distance value associated with a third zoom level which includes a lesser amount of detail than the second zoom level and determines a second subset of the plurality of vertices. The second subset is based on (1) for each second object of the one or more second objects, calculating a distance from each given vertex of the second set of one or more vertices associated with the second object to a line between the immediate neighboring vertices of the given vertex associated with the second object, and (2) determining whether each calculated distance is less than or equal to the tolerance distance value associated with the third zoom level. The processor is also operable to determine a second proportion based on the second subset and the plurality of vertices. If the second proportion is greater than or equal to the minimum threshold value, the processor is operable to calculate a second simplified version of the map information at the third zoom level.

In one alternative, the processor is further operable to identify a tolerance distance value associated with a fourth zoom level. If the second proportion is less than the minimum threshold value, determine a third subset of the plurality of vertices. The third set is based on (1) for each second object of the one or more second objects, calculating a distance from each given vertex of the set of one or more vertices associated with the second object to a line between the immediate neighboring vertices of the given vertex associated with the second object, and (2) determining whether each calculated distance is less than or equal to the tolerance distance value associated with the fourth zoom level. The processor is also operable to determine a third proportion based on the third subset and the plurality of vertices. If the third proportion is greater than the minimum threshold value, the processor is operable to calculate another simplified version of the map information at the fourth zoom level.

In another alternative, the processor is also operable to receive, from a first device, a request for map information associated with a particular zoom level including a particular level of detail. The processor is operable to identify responsive map information associated with a zoom level which includes a level of detail closest to the particular level of detail and which is also greater than or equal to the particular level of detail. The processor is also operable to transmit the responsive map information to the first device for display at the particular zoom level.

In yet another alternative, the processor is also operable to store the simplified version of the map information at the second zoom level and the second simplified version of the map information at the third zoom level in the memory.

DETAILED DESCRIPTION

Figure 1:
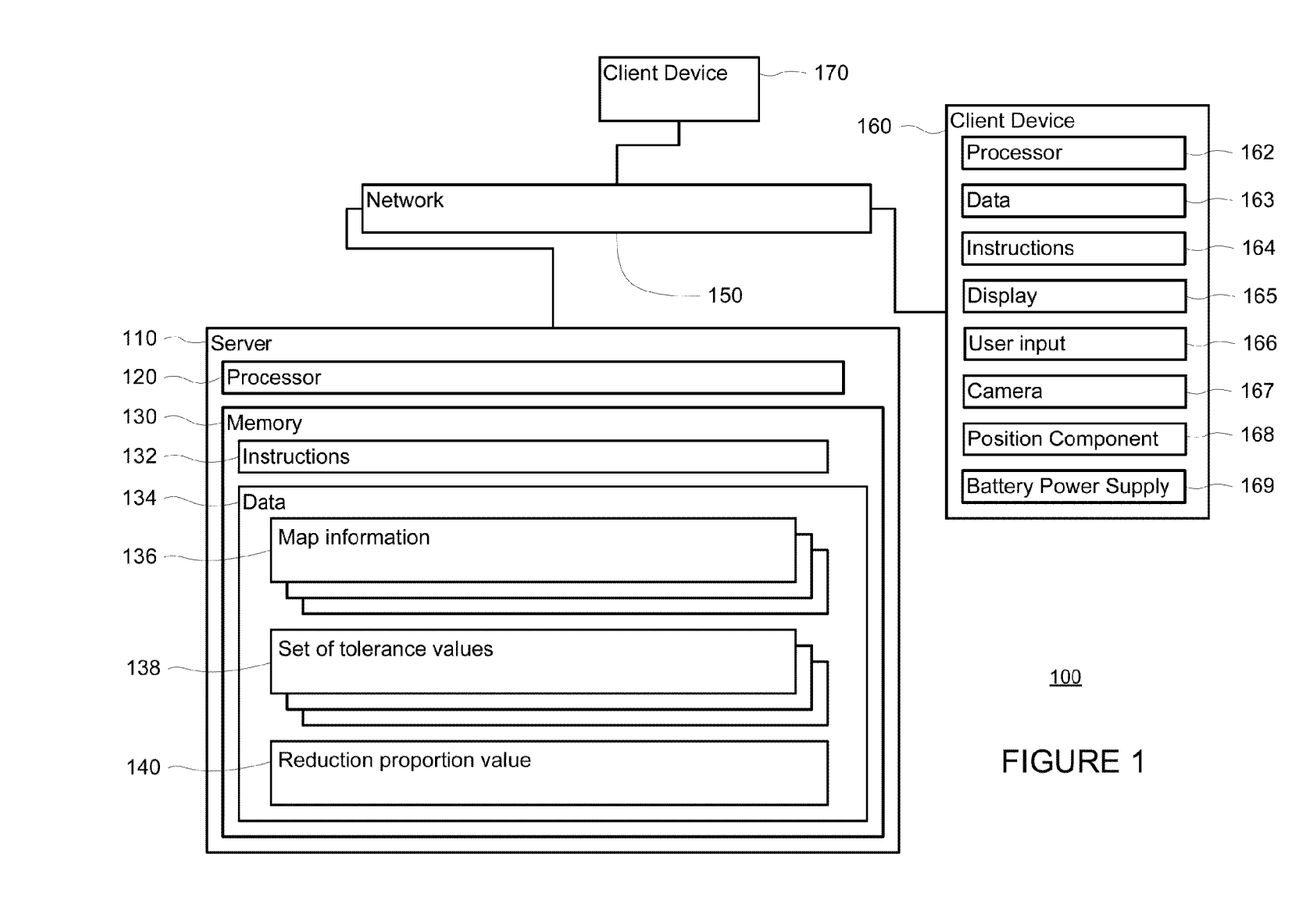
FIG. 1 is a functional diagram of a system in accordance with an aspect of the invention.
Figure 2:
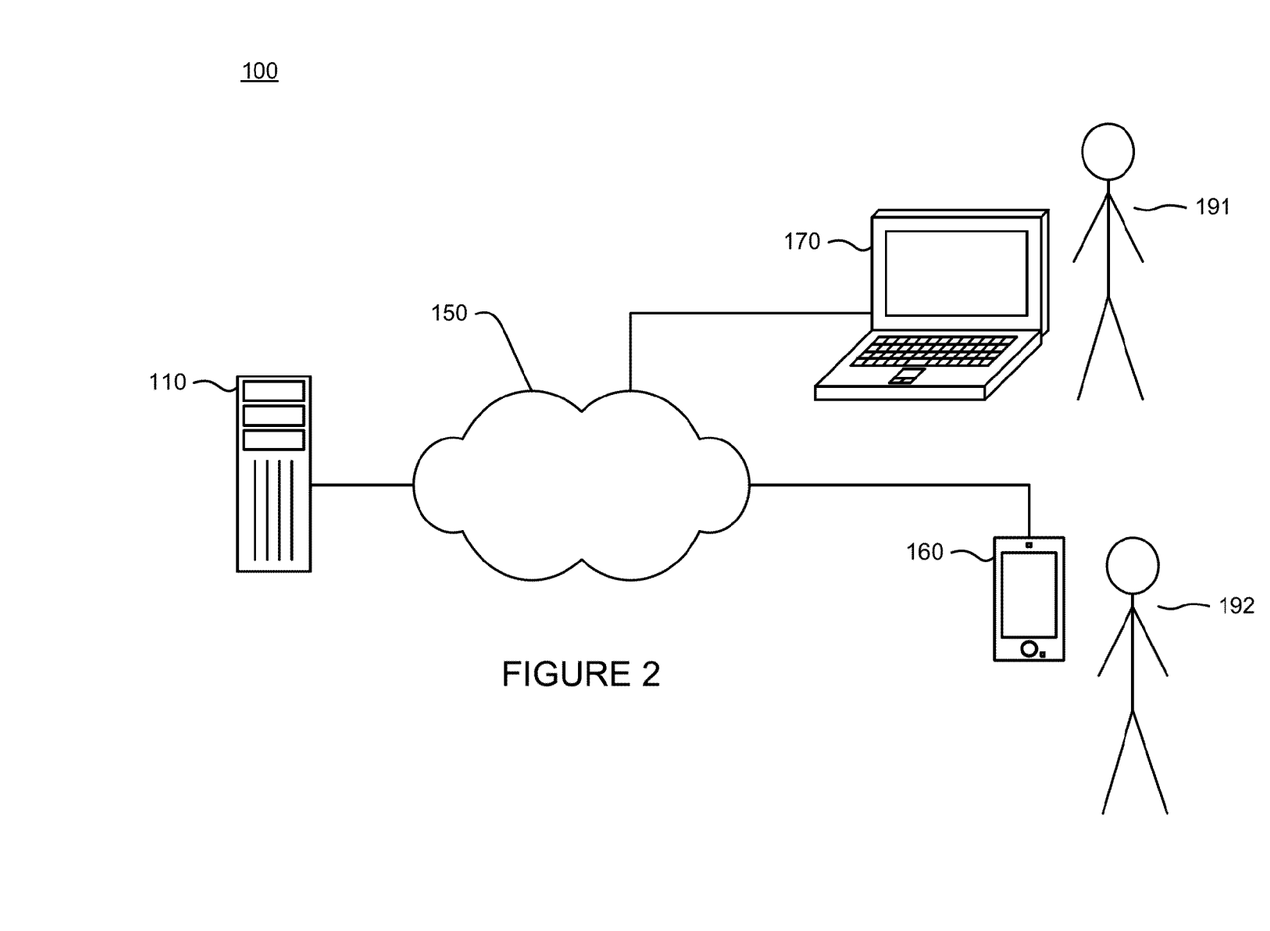
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, computer or memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

It will be understood that the network may also include various other software and hardware components which may perform various intermediate processing steps. For example, some end user devices such as mobile phones may receive and display tile data as opposed to vector data. In this example, a service may request vector data on behalf of the mobile phone. The service (hardware and/or software) may receive the vector data, compute it into image tiles, and transmit the tiles to the mobile phone for display to a user. Accordingly, this "service" may be considered part of the server, client devices, or both.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA, cellular phone, tablet PC, netbook, or other device capable of obtaining information via the Internet. The user may input information using a small keyboard, a keypad, a touch screen, etc.

Data 134 may include map information 136 which may be used to generate one or more maps. The map information may include vector data which may be used to define polygons for various geographical features such as roads, rivers, lakes, countries, continents, oceans, and other features typically found in geographical maps. The various vectors are each associated with geographical locations, such that the server 110 is capable of selecting, retrieving and transmitting one or more vectors to a client device in response to receipt of a geographical location.

This data may be used to render highly detailed views of a world map at various zoom levels. In one example, there may be 20 zoom levels, ranging from level 1 to level 20. Level 20 may be a very high zoom level which allows for display of small portions of a map in great detail. Level 1 may be a very low zoom level which allows for display of large portions of a map in less detail. Thus, the map information has the greatest level of detail and may be associated with zoom level 20, as this is the highest zoom level that may be rendered based on the map information, even though this same information may be used to draw a larger portion of the map at various other zoom levels, such as level 10 or level 1.

Figure 3A:
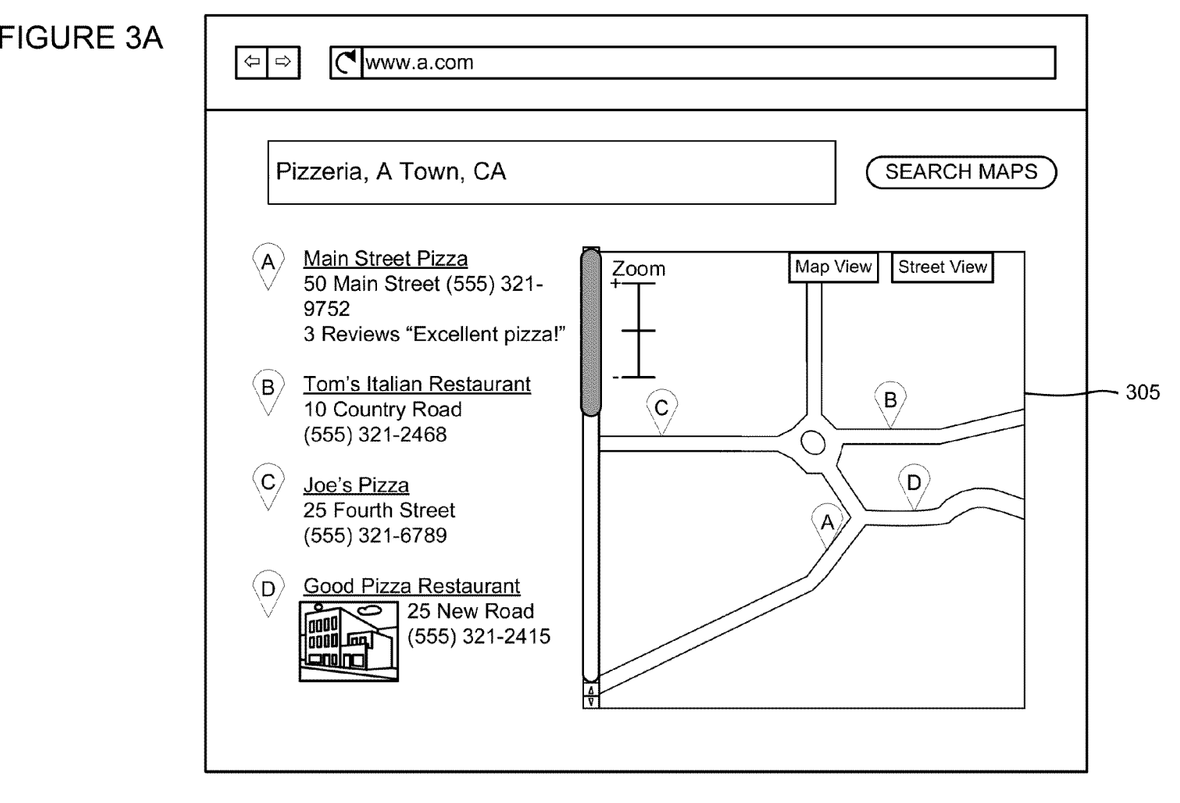
FIGS. 3A and 3B are exemplary screen shots in accordance with an aspect of the invention.
Figure 3B:
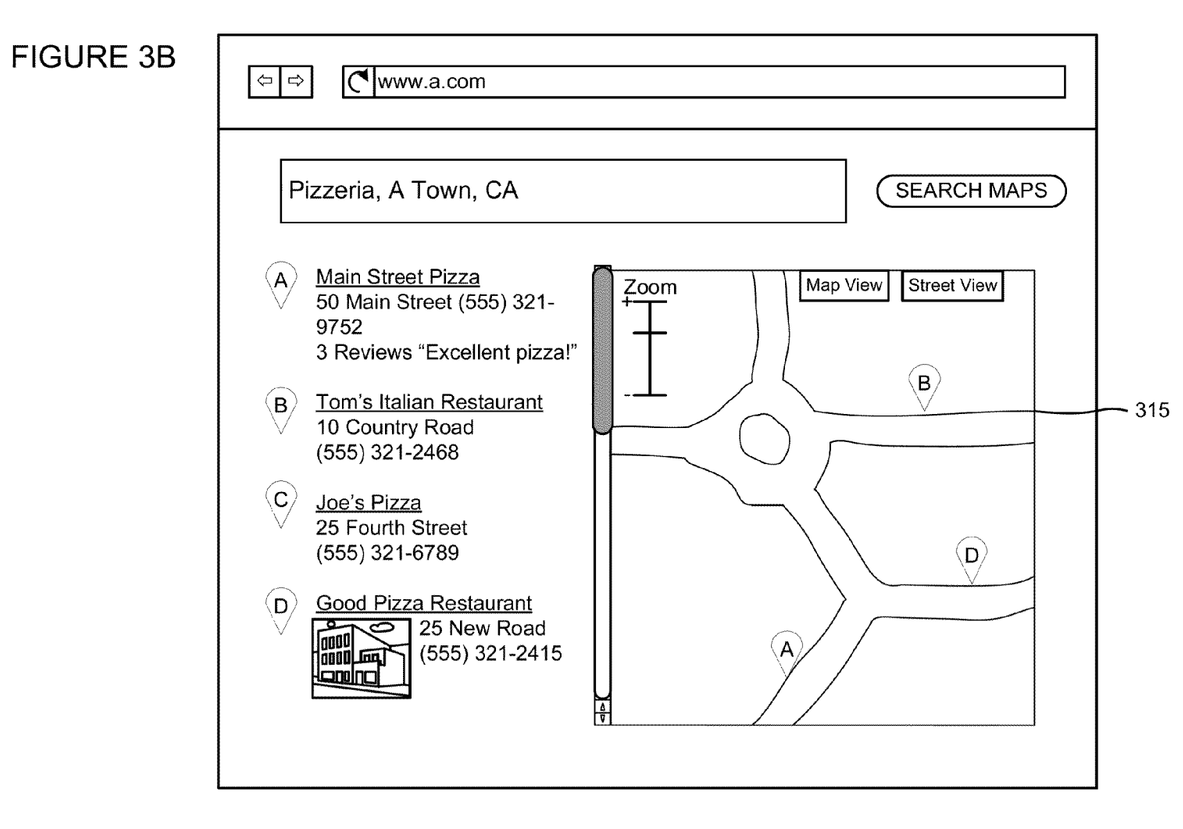

The screen shots of FIGS. 3A and 3B illustrate an exaggerated example of this idea. In these figures, a client device displays search result from a map search. Map 305 of FIG. 3A depicts the physical geometry of various roadways. Map 315 of FIG. 3B is an image of the same general area at a higher zoom level. The curves of the roadways of Map 305 appear smoother than those of Map 315. This is because although the client device may display the same amount of detail, when the information is rendered, as the zoom level decreases (zooming out), less detail is "observed." In other words, some of the finer detail is lost at the lower zoom level. For example, a curved portion of a road segment made up of several points may be rendered as nearly straight as the client device zooms out because fewer of the points are distinguishable.

It will be understood that the geographic locations may be expressed in various ways including but not limited to latitude/longitude positions, street addresses, points on a map (such as when a user clicks on a map), building names, other data capable of identifying one or more geographic locations, and ranges of the foregoing.

The server may also access a set of tolerance values 138. When a vertex is removed from a vector used to render an object, the amount of change to the object before and after the removal of the vertex may be measured, for example, by calculating a distance between the removed vertex and the line formed between the two immediately neighboring vertices.

The tolerance may be based on an estimated amount of change to an object after a simplification process has removed one or more vertices from the object. Because the amount of change to an object will generally increase as the data is simplified for each subsequent zoom level, the tolerance value between the different zoom levels will differ significantly. Thus, the tolerance value may actually be a set of values, each value in the set associated with a particular zoom level. For example, if there are 20 zoom levels, ranging from 1 to 20 as described above, there may be a tolerance value associated with each subsequent zoom level (e.g., 19, 18, 17, etc.) As will be described in more detail below, the set of tolerance values may be used to determine the number of vertices to be removed when simplifying the map information to a particular zoom level.

Data 134 may also include a reduction proportion value 140. As will be described in more detail below, this value may be used to determine whether the simplifying the map information to a lesser zoom level would be worthwhile both from a processing power perspective as well as a storage perspective.

Various operations in accordance with aspects of the invention will now be described. It should also be understood that the following operations do not have to be performed in the precise order described below. Rather, various steps can be handled in a different order or simultaneously.

The server may simplify the map information to a lower zoom level, by removing vertices from the vector data. It will be understood that any polygonal simplification algorithm which allows for the simplification of, in some examples very large polygonal models, may be used. In one example, using features such as "s2polygon," "s2polyline," and "s2polygonbuilder" of the S2-Geometery-Library from Google Inc., a polygon with a set of vertices may be simplified based on a tolerance value. The polygon is then traversed to eliminate vertices that are within the tolerance value of any edges between remaining vertices (as described above). Once this has been completed, the edges may intersect. The edges may then be broken at the intersection points and reassembled to generate a new, simplified polygon.

In one example, the server may generate simplified map information at level 19 by removing vertices from the map information at level 20 (the level with the greatest amount of detail). For example, a simplified geometry appropriate for a given zoom level may be one in which the differences between the simplified version and the original version displayed on a screen of a given size, such as 1000 by 1000 pixels, do not exceed a certain tolerance maximum (described in more detail below), usually equivalent to one screen pixel. Thus, the simplification between the map information at level 19 and the map information at level 20 may be one which differs by no more than a single screen pixel based on the given screen size.

Figure 4:
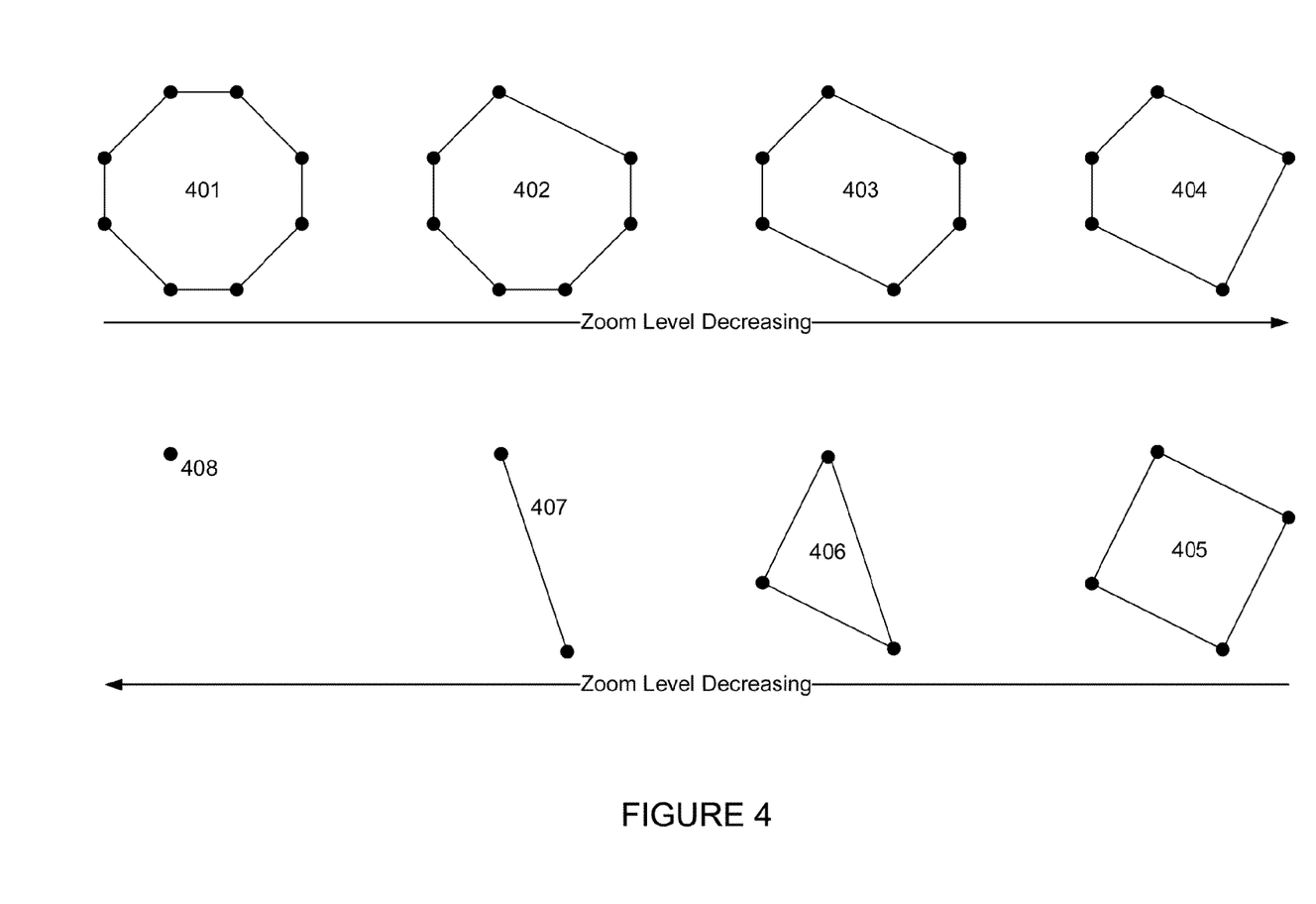
FIG. 4 is a diagram of exemplary data in accordance with an aspect of the invention.

Each time the object is simplified using a simplification algorithm, objects have less detail because one or more vertices may be removed. FIG. 4 depicts a very simplified example of this concept. Feature 401 is a polygon of 8 vertices, here, at the greatest level of detail. Presumably, this would be the view of an object at its highest zoom level. As the zoom level decreases, the simplification for each zoom level removes one or more vertices. Thus, the number of vertices that are "observed" decreases. Feature 402, which has 7 vertices, is generated by removing a vertex from feature 401. As more and more vertices are removed, the polygon becomes simpler and simpler, less and less detailed. Eventually, the polygon becomes a triangle 406, a line 407, and finally a point 408. Accordingly, for each vertex which is removed, the object may change.

In one example, the map information may be computed for each zoom level and stored. However, simplifying this vector data for each of the various zoom levels may be an expensive and time consuming process which requires significant processing power. In addition, storing these simplified versions may also be costly, as the complexity of the map information and the number of different zoom levels increases. The tolerance and reduction may be used to determine when the simplification makes sense.

In one example, the server may quantify this change or the removal effect by calculating a difference between the original object and the simplified object where a vertex is removed. This change may be measured in linear units such as feet, meters, miles, etc. in order to determine a tolerance value for each change. In one example, a first polygon may be simplified by removing a vertex as described about to generate a second, simplified polygon. The differences between the first polygon and the second polygon may be computed based on the difference between the removed vertex and the line between its two immediate neighboring vertices.

Figure 5:
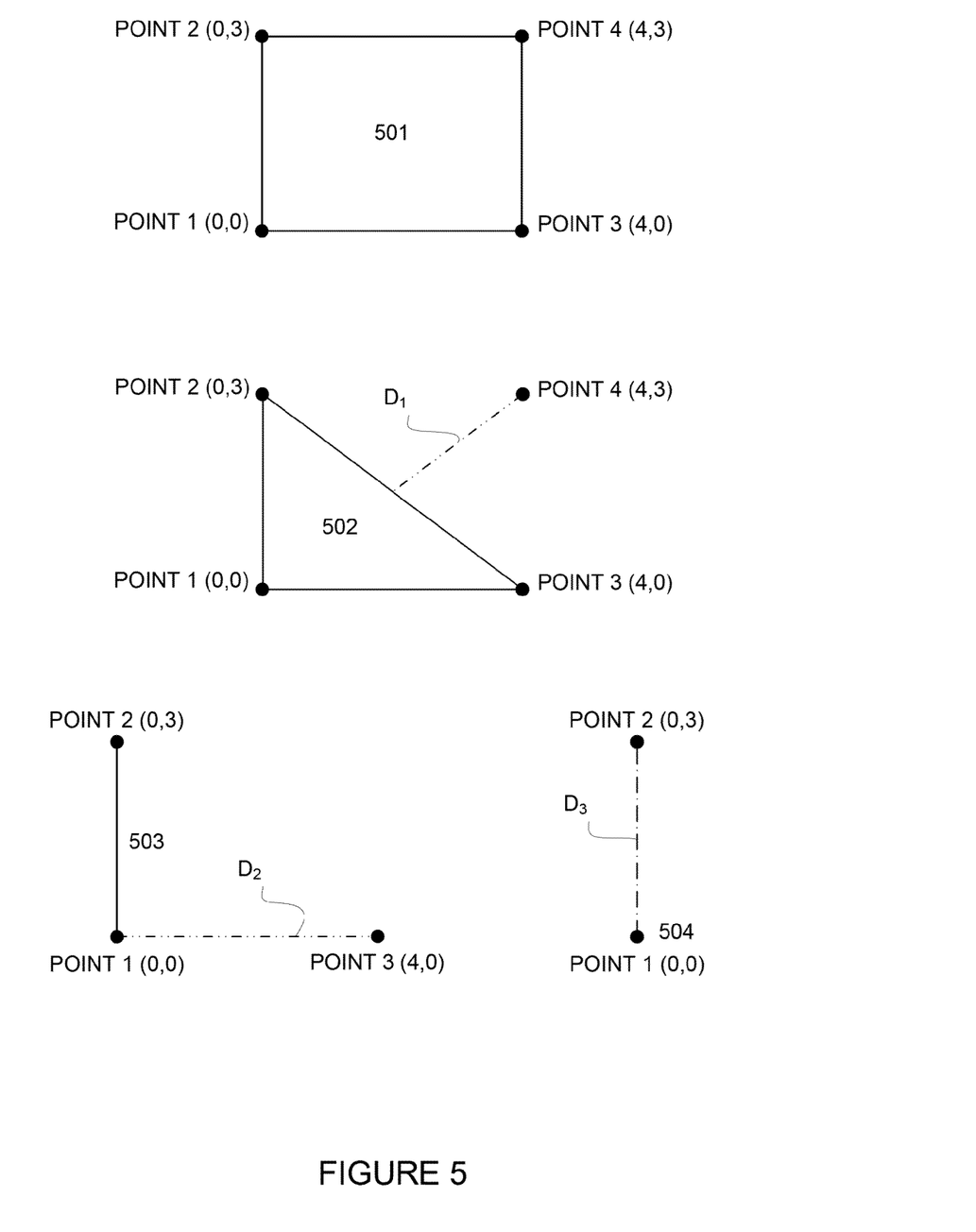
FIG. 5 is another diagram of exemplary data in accordance with an aspect of the invention.

As shown in FIG. 5, polygon 501 includes 4 vertices at different geolocation coordinates: point 1 at (0,0), point 2 at (0,3), point 3 at (4,0), and point 4 at (4,3). Assuming that a first simplification of polygon 504 requires that a point, such as point 4, be removed, the result is triangle 502 with 3 vertices. If a second simplification is performed, a second point may be removed, resulting in line 503. If a third simplification is performed, a third point may be removed, resulting in point 504 at point 1.

The differences between the simplified versions of polygon 501 may be calculated based on the difference values. For example, the difference between polygon 501 and triangle 502 may be calculated based on the distance from point 4 to the line between points 2 and 3 (point 4's immediate neighbors), which is $D_1=2.5$.

The difference between triangle 502 and line 503 may be calculated based on the distance between point 3 and the line between points 1 and 2 (point 3's immediate neighbors), which is $D_2=4$.

The difference between line 503 and point 504 may be calculated based on the distance between point 1 and point 2 (point 1's immediate neighbor) is $D_3=3$.

Each level of simplification for a particular object or polygon is associated with a different tolerance value. Thus, the tolerance value may actually be a set of values, where each value in the set associated with a particular zoom level. If there are 20 zoom levels, level 1 to level 20, for example, there is a tolerance value for each simplification, or 19 total tolerance values in the set.

Using the tolerance values, the server may estimate a proportion of vertices which will be removed during a simplification. For example, the number of vertices of the pre-simplified map information may be V. The server may calculate the number vertices, S, which have a difference value at or above a certain a tolerance value for a particular zoom level. These vertices may be considered to have "met" the tolerance value for the particular zoom level. In other words, each vertex which would have a removal effect below the tolerance value may possibly be removed during the simplification process.

The proportion of vertices may then be used to determine whether to simplify the map information. The server may compute the simplified geometry for a given zoom level Z only if the number of vertices which would meet the tolerance value T (for zoom level z) divided by the total number of vertices at the previous (more accurate) zoom level z' would be greater than or equal to ($R \geq S/V$). For example, if R is 50%, the server may only actually run the simplification process if the number of vertices which would meet the tolerance level is at least 50% of the total number of vertices. Thus, if R=50% and the number of vertices in the map information at level 20 is 100, the number of vertices which meet the tolerance value for level 19 would have to be or more in order for the server to simply the map information to level 19.

If the server determines that R is less than S/V, then the server may examine the next highest zoom level. For example, if the server determines that the number of vertices of the map information at level 20 which meet the tolerance value for level 19 is less than 50% of the total number of vertices, the server may make the same determination for the next highest level. In other words, the server may determine the number of vertices of the map information at level 20 would meet the tolerance value level 18 and whether this number is greater than 50% of the total number of vertices.

As noted above, because distances between vertices which would overlap on a single screen pixel at level 19 would be less than the distances between vertices which could overlap on a single screen pixel at level 18, the tolerance value will be greater for level 18 than level 19. As the simplification is performed at lower zoom levels, the number of vertices to be removed may increase. Thus, it may be likely that even though the number of vertices for the map information at level 20 which meet the threshold value for level 19 is less than R percentage of the total number of vertices, the number of vertices for the map information at level 20 which meet the threshold value for level 18 may be greater than (or equal to) R.

It will be understood that the amount of work to be done may be significantly reduced based upon the value selected for R. For example, if R is very large, for example, greater than 50%, it is unlikely that an R so large would be achieved between every two consecutive zoom levels. Thus, simplifications may not be calculated for each zoom level and simplifications which are calculated are more likely to remove a greater number of vertices.

The computational savings obtained may also result in storage savings as the simplified geometries are computed only when a substantial size reduction can be obtained. In addition, less bandwidth may be needed to transfer the simplified map information to the client device.

Once the server determines that simplifying to a lower zoom level may reduce the total number of vertices V by at least R (based on the number of vertices which are at or above the tolerance value T), the server may simplify the map information as described above. The server may associate the resulting map information with the corresponding zoom level and store this data in memory accessible by the server.

A geometry manifest may be stored, for example, in map information 136 of FIG. 1. The manifest may be used in order to keep track of the zoom levels for which no simplified geometry exists, for which a simplified geometry exists, or both. For example, if the manifest identifies that there are no simplified versions of the map information for levels 1-4, 6-9, 11-14, or 16-19, the server may have access to the map information at zoom levels 5, 10, 15, and 20 (the original map information).

In addition, instead of simplifying based on the original, very large geometry, the server may simplify based on the result of the most recently computed simplification, proceeding in order from the most accurate zoom level to the zoom level corresponding to a world view. This may also reduce the amount of processing required during each subsequent simplification process as the input map information would be significantly reduced. Assuming the server has simplified the map information at level 20 to obtain map information at level 18, the server may now use the map information at level 18 to determine whether to simplify the map information to an even lower zoom level. For example, the server may determine whether the number of vertices of the map information at level 18 which meet the tolerance value for level 17 would be greater than (or equal to) R.

This process may continue until the server has exhausted its examination over each of the zoom levels. For example, the server may continue to determine whether to simplify the map information at each zoom level below 20 (the highest zoom level) until the server reaches zoom level 1 corresponding to, for example, a world view of the map.

Figure 6:
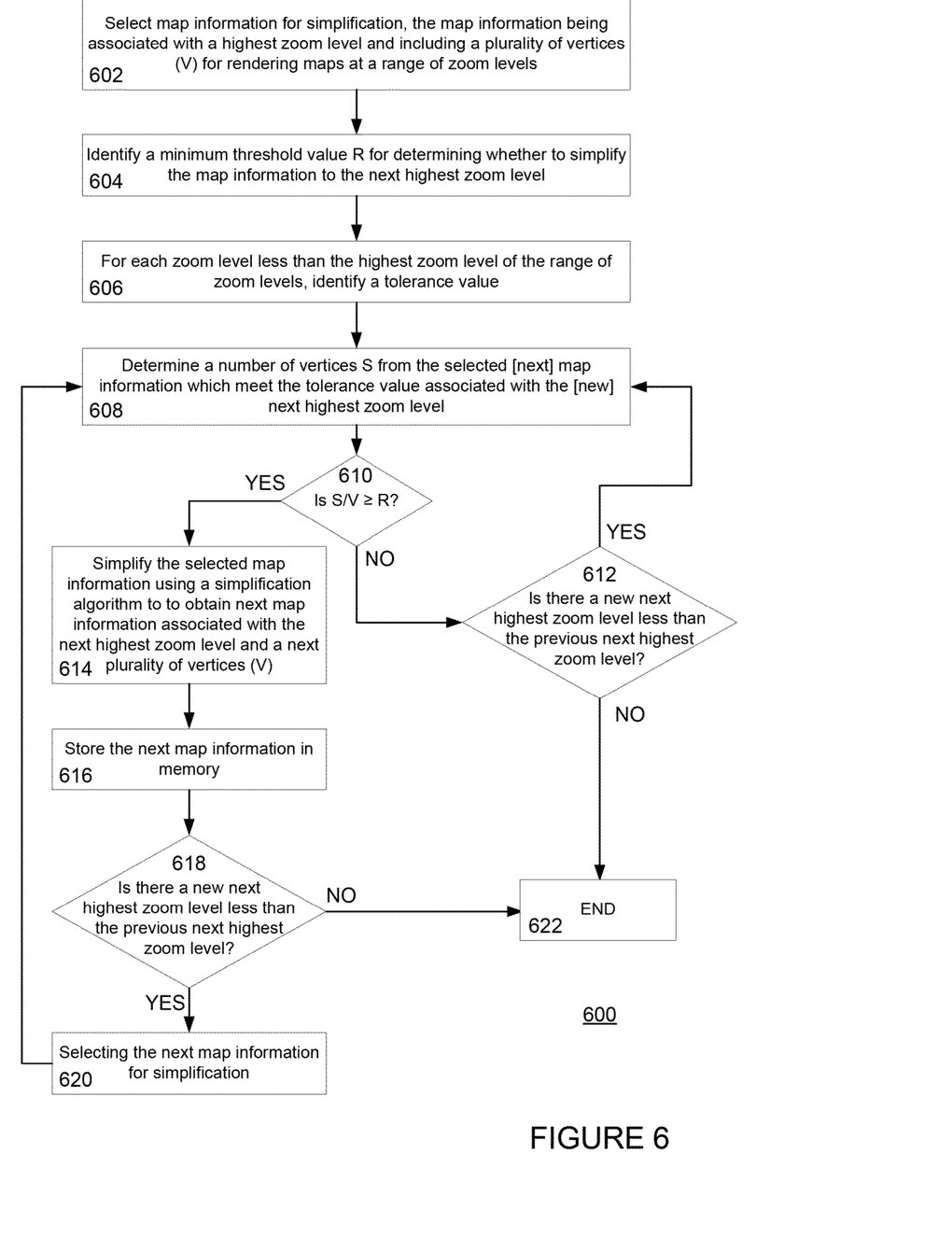
FIG. 6 is an exemplary flow diagram data in accordance with an aspect of the invention.

As shown in flow diagram 600 of FIG. 6, the server selects map information for simplification at block 602. This map information is associated with a highest zoom level and includes a plurality of vertices (V) for rendering maps at various zoom levels. The server identifies a minimum threshold value (R) for determining whether to simplify the map information to the next highest zoom level at block 604. The server may also identify a tolerance value for each zoom level below the highest zoom level at block 606. The server determines a number of vertices (S) which if removed, would be associated with a difference value which is less than or equal to a tolerance value associated with the next highest zoom level at block 608.

At block 610, the server determines whether the number of vertices divided by the plurality of vertices of the selected map information is greater than or equal to the identified minimum threshold value, or whether S/V R. If so, the server simplifies the selected map information using a simplification process to obtain next map information associated with the next highest zoom level and a next plurality of vertices (T) at block 614. The server stores the next map information in memory (e.g. map information 136 of FIG. 1) at block 616. At block 618, the server determines whether the next map information can be simplified further, or whether there is a new next highest zoom level less than the previous next highest zoom level. If not, the process ends at block 622.

If there is a new next highest zoom level less than the previous next highest zoom level, the server selects the next map information for simplification at block 620 and returns to block 608 to calculate the new number of vertices (s) which if removed, would be associated with a difference value which is less than or equal to the tolerance value associated with the new next highest zoom level.

Returning to block 610, if S/V is less than R, the server moves to block 612 to determine if there is a new next highest zoom level less than the previous next highest zoom level. If not, the process ends at block 622. If there is a new next zoom level at block 612, the server again returns to block 608 to determine another number of vertices (S). The server then returns to block 610 to determine whether S/V R based on the new value for S.

Once the simplified map information has been stored (e.g. in map information 136 of FIG. 1), the server may transmit the simplified map information to client devices for display to a user. In one example, the server may receive a request for the map information from a client device (or service) specifying a particular zoom level. In response, the server may access the manifest, examine the map information, return map information associated with the next highest accurate zoom level Z so that the data may be rendered at Z accurately. In other words, the server may provide map information with the requested zoom level, and if the requested zoom level is not available, the server may provide the closest available zoom level that is more accurate than the requested zoom level.

For example, returning to the example above where the manifest identifies that there are no simplified versions of the map information for levels 1-4, 6-9, 11-14, or 16-19, the server may have access to map information at levels 5, 10, 15, and 20. If the request identifies zoom level 6, the server may determine that the next highest zoom level is level 10. Thus, the server may transmit the map information for level 10 to the client device. Similarly, if the request identifies zoom level 14, the server may transmit level 15 to the client device (or service). Again, in some examples, the client service may perform various computations and transmit the map information to the client device. Once the client device has received the map information, the client device may render the map information at the requested zoom level. The server may also send map information associated with a default zoom level, such as the highest stored zoom level or second highest stored zoom level, if no zoom level is specified.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
accessing map information associated with a first zoom level, the map information including a plurality of vertices associated with one or more objects such that each object is associated with a set of one or more vertices of the plurality of vertices;
identifying a minimum threshold proportion for determining whether to simplify the map information;
identifying a tolerance distance value associated with a second zoom level that includes a lesser amount of detail than the first zoom level;
determining, by a processor, a subset of the plurality of vertices based on:
(1) for each object of the one or more objects, calculating a distance from each given vertex of the set of one or more vertices associated with the object to a line between the immediate neighboring vertices of the given vertex, and
(2) determining whether each calculated distance is less than or equal to the tolerance distance value associated with the second zoom level;
determining a proportion based on the subset and the plurality of vertices; and
if the proportion is greater than or equal to the minimum threshold proportion, calculating a simplified version of the map information at the second zoom level.

2. The method of claim 1, further comprising:
identifying a tolerance distance value associated with a third zoom level;
if the proportion is less than the minimum threshold value, determining, by the processor, a second subset of the plurality of vertices based on:
(1) for each object of the one or more objects, calculating the distance from each given vertex of the set of one or more vertices associated with the object to a line between the immediate neighboring vertices of the given vertex, and
(2) determining whether each calculated distance is less than or equal to the tolerance distance value associated with the third zoom level;

determining a second proportion based on the second subset and the plurality of vertices; and if the second proportion is greater than the minimum threshold value, calculating another simplified version of the map information at the third zoom level.

3. The method of claim 2, wherein the second zoom level includes a greater level of detail than the third zoom level.

4. The method of claim 2, wherein the tolerance distance value associated with the second zoom level is less than the tolerance distance value associated with the third zoom level.

5. The method of claim 1, wherein the simplified version of the map information at the second zoom level includes a second plurality of vertices of the plurality of vertices associated with one or more second objects such that each second object is associated with a second set of one or more vertices of the plurality of vertices;

identifying a tolerance distance value associated with a third zoom level which includes a lesser amount of detail than the second zoom level;

determining, by the processor, a second subset of the plurality of vertices based on:
  (1) for each second object of the one or more second objects, calculating a distance from each given vertex of the second set of one or more vertices associated with the second object to a line between the immediate neighboring vertices of the given vertex associated with the second object, and
  (2) determining whether each calculated distance is less than or equal to the tolerance distance value associated with the third zoom level;

determining a second proportion based on the second subset and the plurality of vertices; and if the second proportion is greater than or equal to the minimum threshold value, calculating a second simplified version of the map information at the third zoom level.

6. The method of claim 5, further comprising:

identifying a tolerance distance value associated with a fourth zoom level;

if the second proportion is less than the minimum threshold value, determining, by the processor, a third subset of the plurality of vertices based on:
  (1) for each second object of the one or more second objects, calculating a distance from each given vertex of the set of one or more vertices associated with the second object to a line between the immediate neighboring vertices of the given vertex associated with the second object, and
  (2) determining whether each calculated distance is less than or equal to the tolerance distance value associated with the fourth zoom level;

determining a third proportion based on the third subset and the plurality of vertices; and if the third proportion is greater than the minimum threshold value, calculating another simplified version of the map information at the fourth zoom level.

7. The method of claim 5, further comprising:

receiving, from a first device, a request for map information associated with a particular zoom level including a particular level of detail;

identifying responsive map information associated with a zoom level which includes a level of detail closest to the particular level of detail and which is also greater than or equal to the particular level of detail; and transmitting the responsive map information to the first device for display at the particular zoom level.

8. The method of claim 5, further comprising storing the simplified version of the map information at the second zoom level and the second simplified version of the map information at the third zoom level in memory accessible by the processor.

9. A device comprising:

memory storing map information associated with a first zoom level, the map information including a plurality of vertices associated with one or more objects such that each object is associated with a set of one or more vertices of the plurality of vertices;

a processor coupled to the memory, the processor being operable to:

identify a minimum threshold proportion for determining whether to simplify the map information;

identify a tolerance distance value associated with a second zoom level that includes a lesser amount of detail than the first zoom level;

determine a subset of the plurality of vertices based on:
  (1) for each object of the one or more objects, calculating a distance from each given vertex of the set of one or more vertices associated with the object to a line between the immediate neighboring vertices of the given vertex, and
  (2) determining whether each calculated distance is less than or equal to the tolerance distance value associated with the second zoom level;

determine a proportion based on the subset and the plurality of vertices; and if the proportion is greater than or equal to the minimum threshold proportion, calculate a simplified version of the map information at the second zoom level.

10. The device of claim 9, wherein the processor is further operable to:

identify a tolerance distance value associated with a third zoom level;

if the proportion is less than the minimum threshold value, determine a second subset of the plurality of vertices based on:
  (1) for each object of the one or more objects, calculating the distance from each given vertex of the set of one or more vertices associated with the object to a line between the immediate neighboring vertices of the given vertex, and
  (2) determining whether each calculated distance is less than or equal to the tolerance distance value associated with the third zoom level;

determine a second proportion based on the second subset and the plurality of vertices; and if the second proportion is greater than the minimum threshold value, calculate another simplified version of the map information at the third zoom level.

11. The device of claim 10, wherein the second zoom level includes a greater level of detail than the third zoom level.

12. The device of claim 10, wherein the tolerance distance value associated with the second zoom level is less than the tolerance distance value associated with the third zoom level.

13. The device of claim 9, wherein the simplified version of the map information at the second zoom level includes a second plurality of vertices of the plurality of vertices associated with one or more second objects such that each second object is defined by a second set of one or more vertices of the plurality of vertices, and the processor is further operable to:

identify a tolerance distance value associated with a third zoom level which includes a lesser amount of detail than the second zoom level;

determine a second subset of the plurality of vertices based on:
- (1) for each second object of the one or more second objects, calculating a distance from each given vertex of the second set of one or more vertices associated with the second object to a line between the immediate neighboring vertices of the given vertex associated with the second object, and
- (2) determine whether each calculated distance is less than or equal to the tolerance distance value associated with the third zoom level; and determine a second proportion based on the second subset and the plurality of vertices; and if the second proportion is greater than or equal to the minimum threshold value, calculate a second simplified version of the map information at the third zoom level.

14. The device of claim 13, wherein the processor is further operable to:

identify a tolerance distance value associated with a fourth zoom level;

if the second proportion is less than the minimum threshold value, determine a third subset of the plurality of vertices based on:
- (1) for each second object of the one or more second objects, calculating a distance from each given vertex of the set of one or more vertices associated with the second object to a line between the immediate neighboring vertices of the given vertex associated with the second object, and
- (2) determining whether each calculated distance is less than or equal to the tolerance distance value associated with the fourth zoom level; and determine a third proportion based on the third subset and the plurality of vertices; and if the third proportion is greater than the minimum threshold value, calculate another simplified version of the map information at the fourth zoom level.

15. The device of claim 13, wherein the processor is further operable to:

receive, from a first device, a request for map information associated with a particular zoom level including a particular level of detail;

identify responsive map information associated with a zoom level which includes a level of detail closest to the particular level of detail and which is also greater than or equal to the particular level of detail; and transmit the responsive map information to the first device for display at the particular zoom level.

16. The device of claim 13, wherein the processor is further operable to store the simplified version of the map information at the second zoom level and the second simplified version of the map information at the third zoom level in the memory.

* * * * *